Jan. 21, 1936. A. CHITI 2,028,496

MOVING AND CHANGING SIGN

Filed March 29, 1934  3 Sheets-Sheet 1

Inventor
Aroldo Chiti
By Sommers & Young attys.

Jan. 21, 1936.   A. CHITI   2,028,496
MOVING AND CHANGING SIGN
Filed March 29, 1934   3 Sheets-Sheet 2

Inventor.
Aeoldo Chiti
By Sommers & Young
Attys.

Jan. 21, 1936.  A. CHITI  2,028,496
MOVING AND CHANGING SIGN
Filed March 29, 1934  3 Sheets-Sheet 3

Inventor
Aroldo Chiti,
By Sommers & Young Attys.

Patented Jan. 21, 1936

2,028,496

UNITED STATES PATENT OFFICE 2,028,496

MOVING AND CHANGING SIGN

Aroldo Chiti, Turin, Italy

Application March 29, 1934, Serial No. 718,014
In Germany April 3, 1933

6 Claims. (Cl. 88—24)

This invention relates to an apparatus for producing moving illuminated inscriptions, signs or designs for advertising purposes, wherein an improved effect is obtained with respect to the projection screens constituted by a field of lamps which are successively illuminated.

The apparatus according to this invention comprises an endless opaque moving display film perforated to represent inscriptions or signs, a projector and a transparent screen constituted by a double-convex lenticular system, in which each lenticular element illuminated by the beam passing through each perforation in the film reproduces a separate and distinct image of the source of light of the projector.

The double-convex lenticular system may be stamped from a transparent plate, each lenticular element having the form of a small cube with arcuate external surfaces, or it may be constituted by cylindrical surfaces formed on both faces of the screen, the cylindrical surfaces of one face being orthogonal to the cylindrical surfaces of the other face.

A further purpose of this invention is to provide a compact projection mechanism of small size, which allows of using endless films of considerable and various lengths.

The annexed drawings show by way of example a constructional form of the projection apparatus according to this invention.

Figure 1:
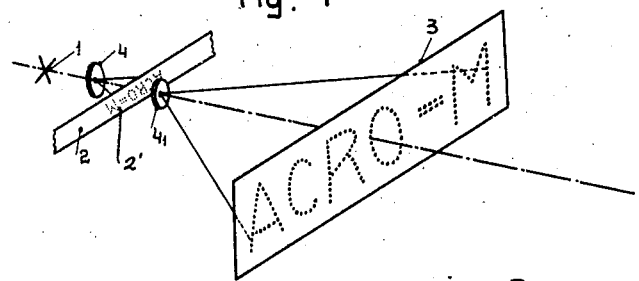
Fig. 1 is a diagrammatic perspective view.

Referring to the drawings, 1 denotes a source of light, 2 an opaque perforated display film and 3 a screen; 4, 4' indicate diagrammatically the lens of the optical device of the projector. The film 2 is provided with perforations 2' which represent letters, words and inscriptions. In Fig. 1 the screen 3 is perpendicular to the axis of the projection beam, it may however be inclined with respect to said axis. The illuminated image owing to the movement of the perforated film moves on the screen 3 constituted by a lens system producing the above described effect.

When the screen is inclined, the images are magnified or diminished according to the direction of movement of the film.

Figure 2:
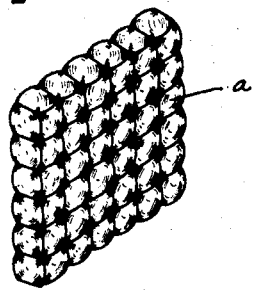
Figs. 2 and 3 show diagrammatically two constructional forms of the lenticular screen.
Figure 3:
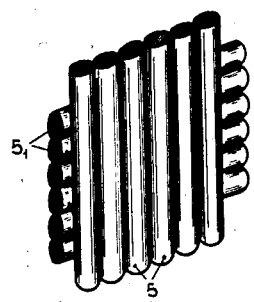

The screen is constituted, for instance, by a system of double-convex lenses $a$ which can be stamped from a single plate, as shown in Fig. 2, or by set of cylindrical bars 5 and 5₁, at right angle to each other.

A single set of bars may also be used, provided with a semi-cylindrical surface on one side and semi-cylindrical surface sections perpendicular to the first mentioned semi-cylindrical surface on the other side.

Figure 4:
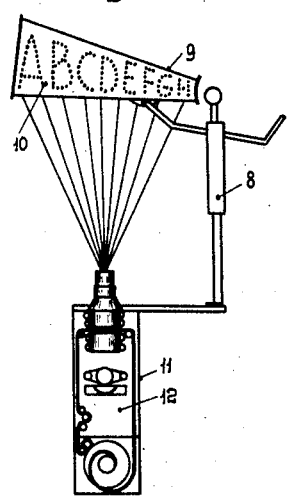
Figs. 4 and 5 are a front view and a side view respectively of an advertising apparatus showing the outline of a person talking through a megaphone.
Figure 5:
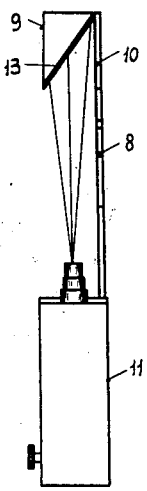
Figure 9:
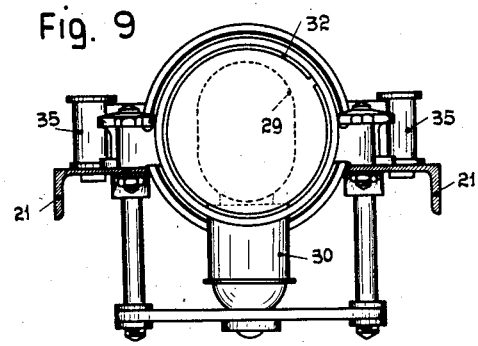
Fig. 9 is a cross section of Fig. 7.
Figure 10:
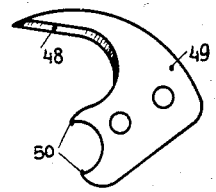
Fig. 10 is a detail of the film deflector.
Figure 11:
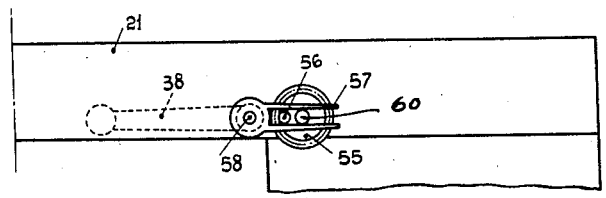
Fig. 11 shows a detail of the device for advancing the film intermittently.

The advertising apparatus diagrammatically shown in Figs. 4 and 5 shows the outline of a person 8 talking through a megaphone 9. The outline of the megaphone constitutes the frame of a projection screen 10 of the lenticular system above described. The base 11 of the apparatus houses the projection apparatus 12, a mirror 13 reflects the image on the screen, which is inclined with respect to the beam axis, so that the moving projected image is magnified on moving away from the mouth of the speaking person towards the open end of the megaphone thus giving a striking advertising effect.

According to the invention the projection may be coloured by inserting a colour filter in the path of the projection beam. The filter may be automatically inserted and removed at the desired intervals of time by means of the perforated film.

Figure 6:
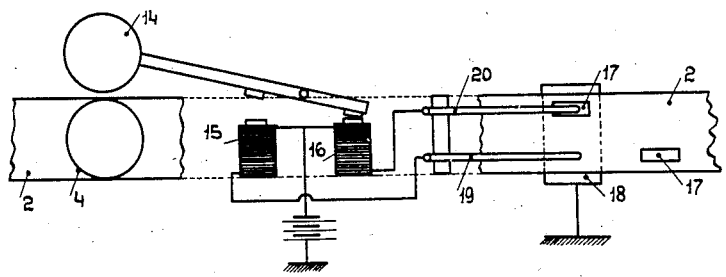
Fig. 6 shows diagrammatically a device for inserting automatically a transparent colour filter on the path of the luminous projection beam.

Figure 6 shows a constructional form of an apparatus serving for the said purpose.

A colour filter 14, subjected to the action of two electromagnets 15 and 16 either of which is energized when desired during the projection, oscillates in front of the objective 4, behind which the film 2 is moved. The film 2 of non-conductive material is provided with openings or slits 17 and moves between a driving roller 18 and the brushes 19 and 20 respectively of the windings of said electromagnets, the brushes being insulated from one another. Each time a slit passes under a brush, the electric circuit of either electromagnet closes and the colour filter is put in or out of the way of the beam.

The projection device shown in detail in Figures 7 to 11 comprises two parallel L-shaped bars 21 connected to each other at one end by means of plates 22 supporting the mechanism for advancing the film and at their other ends by means of an objective carrier 23 in which the objective 24 is adjustably mounted. A cylindrical box 26 open at both ends is secured by means of screws 25 to the back of the objective-carrier and houses a condenser constituted by two convexo-plane lenses 27 pressed against annular beads of the box ends by means of a spring 28.

A source of light 29 is arranged at any desired distance from said condenser. The lamp holder 30 is secured to the bars and is adjustable in the longitudinal direction, by means for instance of screws engaging slots 31 in the lamp holder.

A reflector 32 completing the optical part of the projector is secured to the bars behind the luminous source.

A small interspace 33 between the objective-carrier 23 and the box 26 constitutes the projection window. The film 34 passes through said window and is guided by rollers 35.

The display film runs along one of the bars and over a guide roller 36, then on a roller 37 loosely mounted on one end of an oscillating arm 38 and finally on a guide roller 39 thus forming a loop 40; then again in the direction of the bar, over a guide roller 41, to the toothed winding roller 42 and is finally wound on the spool constituted by a circular set of antifriction rollers 43 loosely mounted on parallel axes supported by a cage 44. The film may be wound on said spool in one or more turns according to its length, the thickness of the winding being limited by the outer box 45.

A toothed unwinding roller 46 is mounted concentrically to the annular set of antifriction rollers 43 and receives the film the inner turn of which is deviated towards the center of the spool by means of the guide roller 47. The unwinding roller 46 forces the film against a helical surface 48 formed on a guiding piece 49 secured to the plate 22 and provided with two teeth 50 engaging corresponding grooves 51 in the unwinding roller 46.

By said helical surface 48 the film is axially displaced upwards (Fig. 8) thus becoming disengaged from the spool and forming a wide slack loop, then it passes through a brush 52 and is returned along the other bar to the roller 35 and to the projection window 33.

Figure 7:
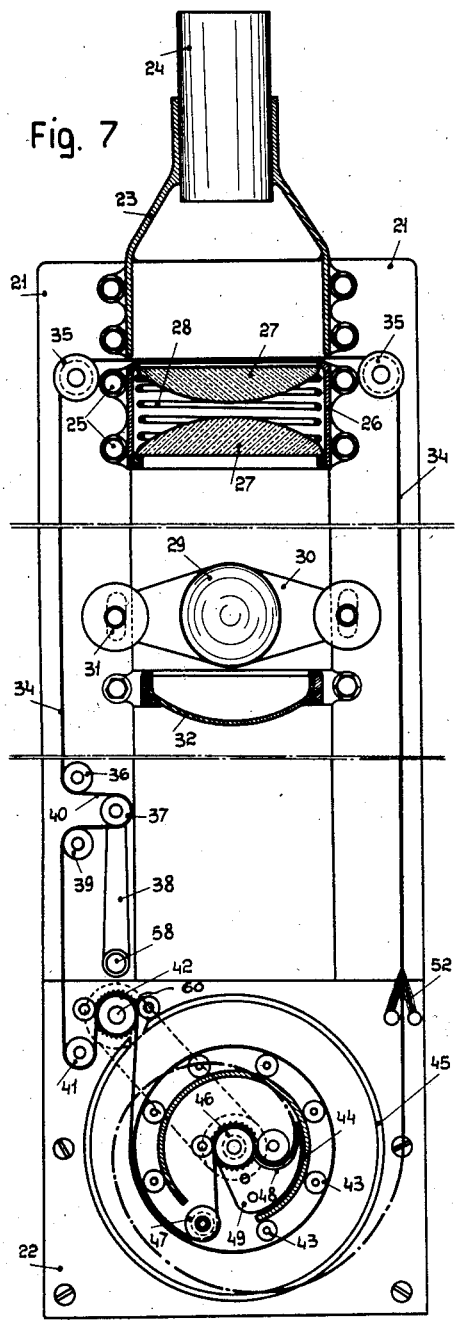
Fig. 7 is a plan view on a larger scale partially sectioned of the projection mechanism.
Figure 8:
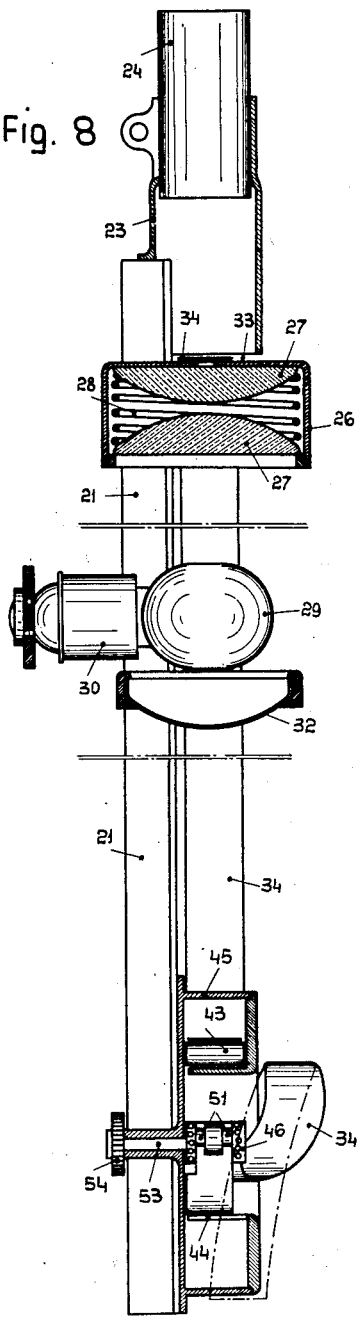
Fig. 8 is a vertical longitudinal section of Fig. 7.

The unwinding roller 46 is keyed to a shaft 53 carrying at its outer end a toothed wheel 54 connected through a chain, not shown, to a toothed wheel 55 (Fig. 11) keyed to the shaft 60 carrying the winding roller 42 (Fig. 7). The wheel 55 carries a crank pin 56 cooperating with a fork 57 keyed to the pin 58 on which the oscillating arm 38 is secured.

The pin 58 is preferably mounted displaceable in an axial direction so that by pushing it downwards against the action of a spring (not illustrated) the fork 57 is disengaged from the crank pin 56 and the arm 38 may thus be made inoperative when a continuous exhibition is desired.

A stop (not illustrated) which can be readily unlocked maintains the pin 58 in the inoperative position for any desired time.

The above described projection apparatus may be advantageously used for advertising purposes owing to the fact that it works automatically without any control.

By using the intermittent motion device animated cartoons may be exhibited.

The endless film may be readily fitted, removed and replaced through the upper opening of the window 33 and spool without cutting it. The unwinding roller 46 arranged centrally to the spool in combination with the deflector 49 allows an unwinding of the film free of excessive strains or deformations.

What I claim is:

1. In an apparatus for producing moving illuminated inscriptions, signs or designs for advertising purposes, the combination of an opaque film, in which the letters or signs are formed by a sequence of small holes, a source of light, a projector and a screen constituted by a double convex lens system, in which each lenticular element is in such relation with said holes that each luminous beam passing through each hole of the film reproduces a separate distinct and sharp image of said source of light.

2. In a device for projecting moving illuminated inscriptions, signs and designs, the combination of an endless opaque film, having perforations to represent the signs, a source of light, a projector for the source of light, a projection window in front of the source of light, said window being open on one side for the introduction of said film, an operating device for advancing said film, said operating device being opened on one side and so formed as to allow of a ready and quick replacing of the film and use of films of various lengths and a transparent screen constituted by a double-convex lenticular system, in which each luminous beam passing through each perforation of the film reproduces a separate and distinct image of said source of light.

3. In a device for projecting moving illuminated inscriptions, signs, and designs, the combination of an endless opaque film, having perforations to represent the signs, a source of light, a projector for the source of light, an exhibiting window in front of the source of light, said window being opened on one side for the introduction of the film, a spool formed by a circular set of loose parallel rollers on which a number of turns of said film corresponding to its length are wound, a toothed unwinding roller for successively unwinding the inner turns of the film, a deflector for deviating spirally the film towards the outer side of the spool, a toothed winding roller for advancing the film through the projection window and winding it on said spool, operating means for connecting together said winding and unwinding rollers and a transparent screen constituted by a double-convex lenticular system, in which each luminous beam passing through each perforation of the film reproduces a separate and distinct image of said source of light.

4. In a device for projecting moving illuminated inscriptions, signs and designs, the combination of an endless opaque film having perforations to represent the signs, a source of light, a projector for the source of light, a projection window in front of the source of light, said window being opened on one side for the introduction of the film, a spool formed by a circular set of loose parallel rollers on which a number of turns of said film corresponding to its length are wound, a toothed unwinding roller concentrically mounted within said spool for unwinding successively the inner turns of said film, a deflector for deviating spirally the film towards the outer side of the spool, a toothed winding roller mounted externally of and near to said spool, for advancing the film through the projection window and winding it on said spool, operating means for connecting together said winding and unwinding rollers, a device for advancing intermittently the film controlled by said winding roller and a transparent screen constituted by a double-convex lenticular system, in which each luminous beam passing through each perforation of the band reproduces a separate and distinct image of said source of light.

5. A device for producing moving illuminated inscriptions, signs and designs, as claimed in claim 4, in which the device for the intermittent advancing of the film is constituted by an oscillating lever provided at one end with a slit, a crank pin carried by the winding roller and engaging said slit, a guide roller for the film at the other end of said lever and two stationary guide rollers over which the film runs forming a loop and means for disengaging at will the oscillating lever from the crank pin.

6. In a device for projecting moving illuminated inscriptions, signs and designs, the combination of an endless opaque film, having perforations to represent the signs, a source of light, a projector for the source of light, an exhibiting window in front of the source of light, said window being opened on one side for the introduction of said film, an operating device for advancing said film, said operating device being opened on one side and so formed that films of various lengths may be used, a box housing the film source of light, projector and operating mechanism, an upright in the form of a person on said box body in the form of a megaphone supported by said upright, a face of said megaphone being constituted by a transparent screen arranged at an inclination with respect to the projection axis and constituted by a double-convex lenticular system, in which each luminous beam passing through each perforation of the film reproduces a separate and distinct image of said source of light.

AROLDO CHITI.